(12) United States Patent
Howell

(10) Patent No.: US 10,927,758 B1
(45) Date of Patent: Feb. 23, 2021

(54) SAFETY SHIELD FOR AIRCRAFT NACELLE

(71) Applicant: Janie M. Howell, Savannah, GA (US)

(72) Inventor: Janie M. Howell, Savannah, GA (US)

(*) Notice: Subject to any disclaimer, the term of this patent is extended or adjusted under 35 U.S.C. 154(b) by 159 days.

(21) Appl. No.: 16/055,263

(22) Filed: Aug. 6, 2018

(51) Int. Cl.
*F02C 7/055* (2006.01)
*B64D 33/02* (2006.01)

(52) U.S. Cl.
CPC .............. *F02C 7/055* (2013.01); *B64D 33/02* (2013.01); *B64D 2033/022* (2013.01); *B64D 2033/0286* (2013.01)

(58) Field of Classification Search
CPC . F02C 7/055; F02C 7/05; F02C 7/052; B64D 33/02; B64D 2033/0286
See application file for complete search history.

(56) References Cited

U.S. PATENT DOCUMENTS

| | | | | |
|---|---|---|---|---|
| 2,814,454 A * | 11/1957 | Atkins | ................. | F02C 7/055 244/102 R |
| 2,931,460 A * | 4/1960 | McEachern | ............. | F02C 7/055 55/306 |
| 3,369,776 A * | 2/1968 | Puryear | .................... | F02C 7/055 244/53 B |
| 6,883,751 B2 | 4/2005 | Koncsek | | |
| 7,803,204 B1 * | 9/2010 | Mladinich | ................ | F02C 7/055 244/136 |
| 8,052,083 B1 * | 11/2011 | Moran | ................... | B64D 33/02 244/53 B |
| 2003/0089233 A1 * | 5/2003 | Borla | .................. | B01D 46/2403 95/273 |
| 2008/0173276 A1 * | 7/2008 | Barnard | ............. | B01D 46/0013 123/198 E |
| 2009/0007528 A1 * | 1/2009 | Wilson | .................. | B01D 46/002 55/306 |
| 2010/0270427 A1 * | 10/2010 | Barrientos | ............. | B64D 33/02 244/1 R |
| 2010/0287908 A1 * | 11/2010 | Cunningham | ......... | B64D 33/02 60/39.092 |
| 2010/0313542 A1 * | 12/2010 | Bansa | .................... | B64D 33/02 60/39.092 |
| 2011/0011055 A1 * | 1/2011 | Troy | ....................... | F02C 7/055 60/39.092 |
| 2011/0146294 A1 * | 6/2011 | Townsend | ............... | F02C 7/055 60/779 |
| 2011/0265650 A1 * | 11/2011 | Kazlauskas | ............ | B64D 33/02 95/269 |

(Continued)

FOREIGN PATENT DOCUMENTS

JP           2000095195 A   *  4/2000

*Primary Examiner* — Gerald L Sung
(74) *Attorney, Agent, or Firm* — Sanchelima & Associates, P.A.; Christian Sanchelima; Jesus Sanchelima

(57) ABSTRACT

The present invention is a safety shield to be secured with nacelle of aircraft. Safety shield is shaped like nacelle such that nacelle is covered by use of safety shield. Shield frame of safety shield is provided with a plurality of openings of pre-defined size and shape and disposed at desired orientations. Openings facilitate ventilation to a mechanical engine provided in nacelle. Safety shield is connected to nacelle by clamping elements that securely clamps safety shield with nacelle. In operation, safety shield prevents collision of birds and foreign particles with fan blade of mechanical engine and thus saves life and failure of mechanical engine.

4 Claims, 3 Drawing Sheets

(56) References Cited

U.S. PATENT DOCUMENTS

| | | | |
|---|---|---|---|
| 2012/0090300 A1* | 4/2012 | Champoux | F02C 7/055 |
| | | | 60/274 |
| 2014/0352795 A1* | 12/2014 | Kline | F02C 7/05 |
| | | | 137/15.1 |
| 2016/0319743 A1* | 11/2016 | Thomas | F02C 7/055 |
| 2017/0292448 A1* | 10/2017 | Dornier | F02C 7/055 |
| 2018/0312270 A1* | 11/2018 | Boyce | B64D 33/02 |
| 2019/0085697 A1* | 3/2019 | Choi | F04D 27/0253 |

\* cited by examiner

SAFETY SHIELD FOR AIRCRAFT NACELLE

BACKGROUND OF THE INVENTION

1. Field of the Invention

The present disclosure relates to a safety shield for use in aircraft. More particularly, the present disclosure relates to a safety shield provided for nacelle of an aircraft.

2. Description of the Related Art

In recent years, a lot of accidental cases are reported with regards to bird aircraft strike hazards in which there is a collision between an airborne animal (like a bird or bat) or foreign particles and an aircraft which is a manmade vehicle. In event of collision it is likely that birds or foreign particles are sucked in the mechanical engine provided in nacelle of aircraft which ends up life of birds. Moreover, bird or foreign particles struck with a fan blade of mechanical engine and results in displacement of one blade on another for causing cascading failure. Any failure in engine leads to hazardous accidents which can cause loss of humans and properties.

Several designs of various shield/deflector for shielding nacelle of aircrafts have been designed in the past. None of them, however, include a shield for protecting nacelle of aircraft which is simple in design and provided with ventilations, simplified manufacturing, installing and removing during maintenance. Moreover, the shield provides more stability and secureness.

Applicant believes that a related reference corresponds to US patent application 20100287908 filed by Cunningham Ray E. titled 'Jet engine shield and debris deflector' discloses a shield device which is aerodynamically shaped in the form of a frustro-conical cylinder and is configured with a series of openings or slots that allow sufficient air to be entrained into the jet engine intake. However, achieving a frustro-conical cylinder and configuring slots thereon is associated with a number of manufacturing complexities. Also, removal and fitment of such aerodynamically shaped shield device can be time consuming.

Another U.S. Pat. No. 6,883,751 filed by Boeing Co. titled 'Apparatus and method for preventing foreign object damage to an aircraft' discloses a deflecting member which is coupled to the aircraft between the landing gear and an inlet of the engine so that when the deflecting member is extended, it intersects with a portion of lines of sight between the landing gear and an inlet of the engine. However, providing such long deflecting member extending between gear to inlet of engine is not required as protection is moreover required in the engine area. Such long deflecting member utilizes more material and hampers overall cost.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. The present invention is a safety shield to be secured with nacelle of aircraft. Safety shield is shaped like nacelle such that nacelle is covered by use of safety shield. Shield frame of safety shield is provided with a plurality of openings of pre-defined size and shape and disposed at desired orientations. Openings facilitate ventilation to a mechanical engine provided in nacelle. Safety shield is connected to nacelle by clamping elements that securely clamps safety shield with nacelle. In operation, safety shield prevents collision of birds and foreign particles with fan blade of mechanical engine and thus saves life and failure of mechanical engine.

It is one of the main objects of the present invention is to provide a safety shield for aircraft nacelle that is simple in design and hence easy to manufacture and provides adequate shielding for airborne animals and foreign particles.

It is another object of this invention is to provide a safety shield for aircraft nacelle that is easy to install and remove for maintenance.

It is another object of this invention is to provide a safety shield for aircraft nacelle that provides adequate ventilation to a mechanical engine provided in nacelle.

It is another object of this invention is to provide a safety shield that is easy to be modified as per different shape and size of nacelle and that is easily retrofitted in existing nacelles or fitted in new nacelles and provides stability and secureness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
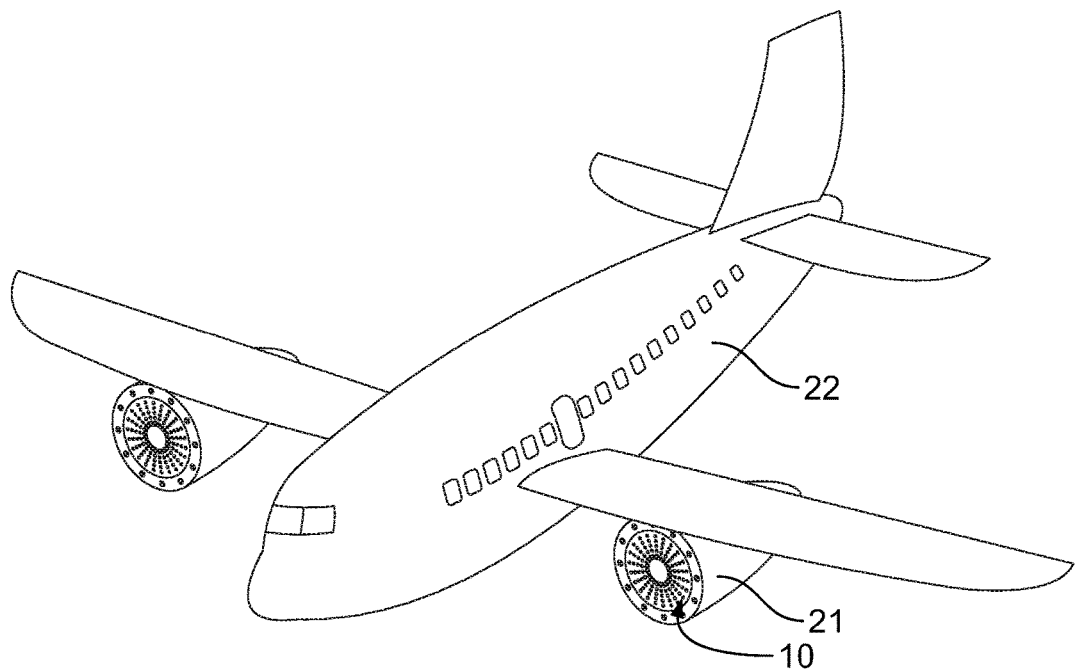
FIG. 1 represents a perspective view of a safety shield fitted on a nacelle of an aircraft, in accordance with one embodiment of the present invention.
Figure 2:
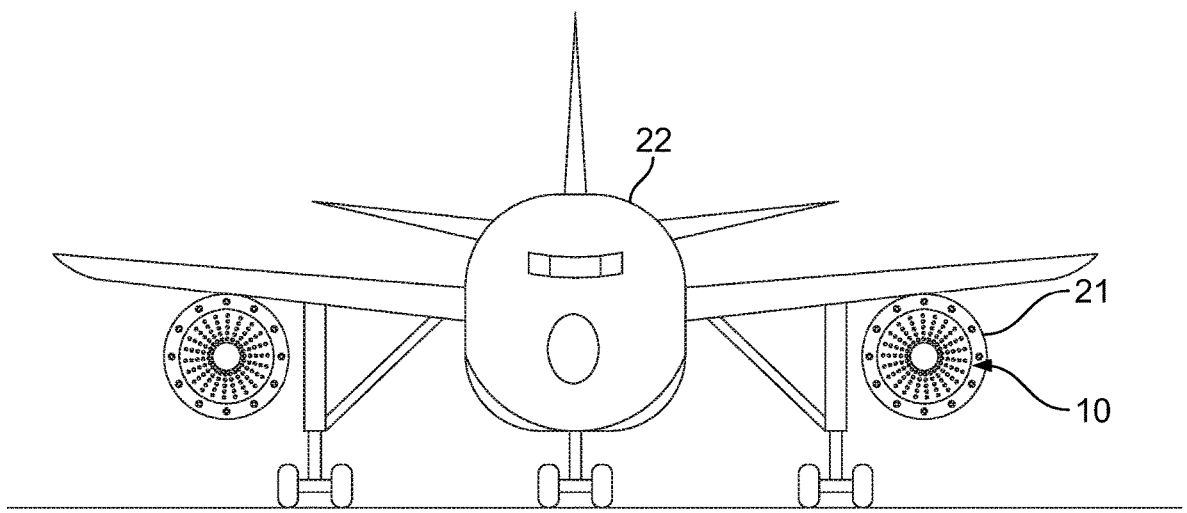
FIG. 2 is a front view of safety shield of FIG. 1.
Figure 3:
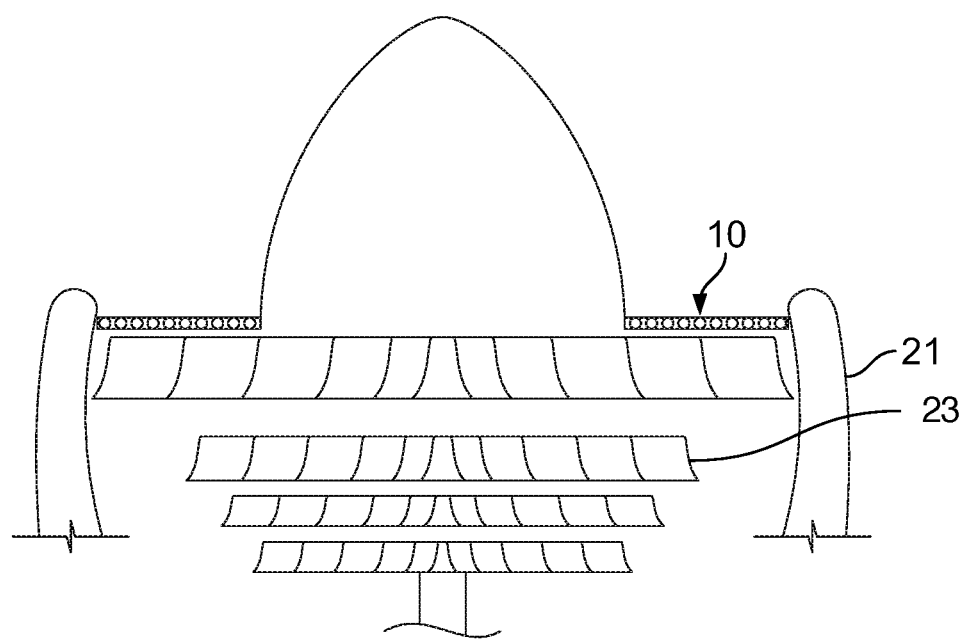
FIG. 3 represents a cross-sectional view of safety shield of FIG. 1 shielding a mechanical engine provided in nacelle.
Figure 4:
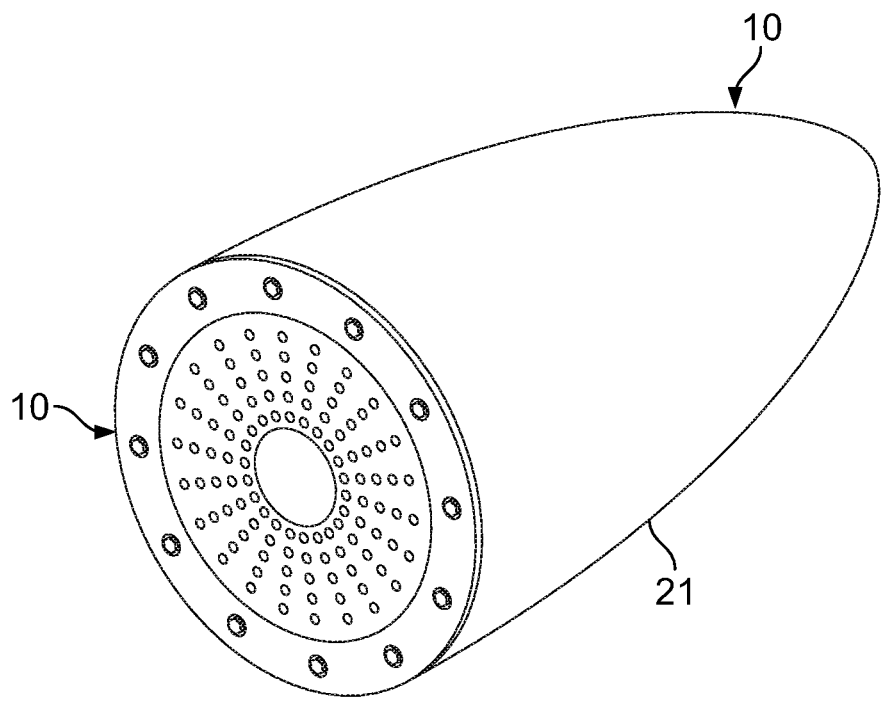
FIG. 4 represents a perspective view of safety shield fitted on nacelle of FIG. 1.
Figure 5:
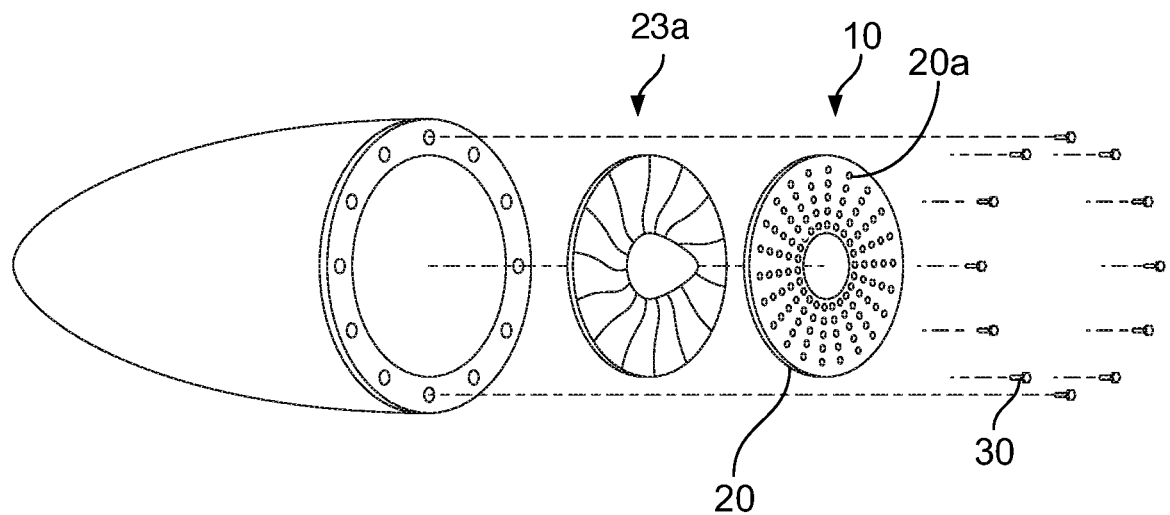
FIG. 5 represents an exploded view of safety shield of FIG. 1.
Figure 6:
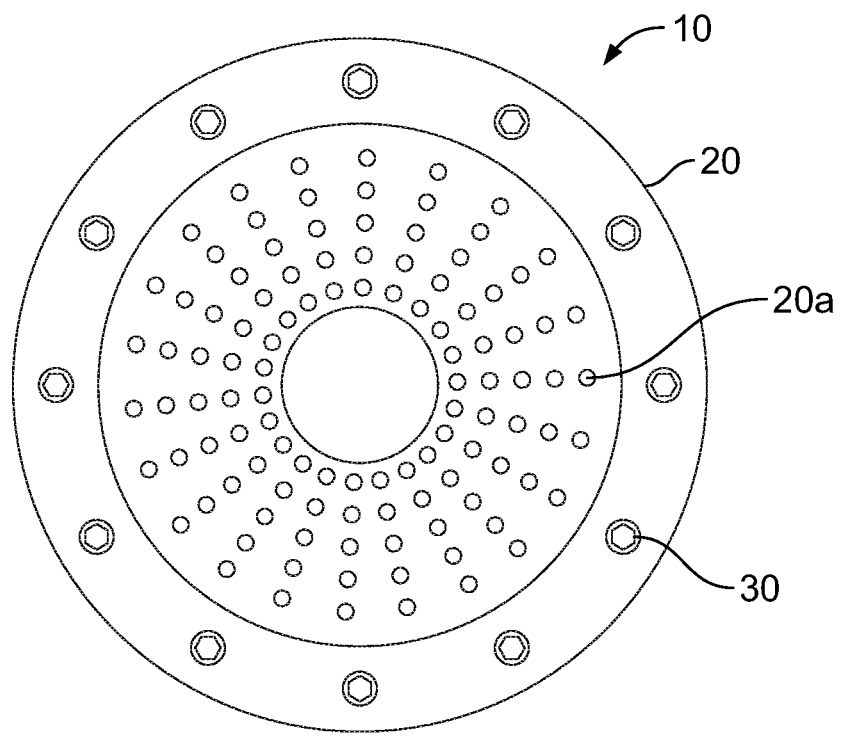
FIG. 6 represents a front view of safety shield of FIG. 1.

Referring now to the drawings (FIGS. 1 to 6), where the present invention is generally referred to with numeral 10, it can be observed that a safety shield, in accordance with one embodiment, is provided that includes a shield frame 20 and a clamping elements 30.

Shield frame 20 is fitted on a nacelle 21 of an aircraft 22. Shield frame 20 is basically a frame with a plurality of openings 21. Size of openings 20a is such that openings 20a provide sufficient ventilation to dissipate heat of a mechanical engine 23 fitted in nacelle 21. Shape of openings 20a can be any desired shape or can be various combinations of shapes. Size and shape of shield frame 20 is complementary to size and shape of nacelle opening such that shield frame 20 can be easily fitted and removed from nacelle 21.

Clamping elements 30 is used to clamp shield frame 20 to nacelle 21. Clamping elements 30 can be bolts, or riveted of fasten with screws and the like. In another embodiment, clamping elements 30 can be integral with shield frame 20, for instance, clamping elements 30 can be of size such that clamping elements 30 can be press fitted with nacelle 21. Also additionally, adhesives can be used for securing clamping elements 30. Clamping elements 30 are not limited to ones mention herein the present disclosure and any other clamping elements 30 that can easily secure and remove shield 20 from nacelle 21 are within the scope of the present disclosure.

In one embodiment, safety shield 10 is made of high quality, heat resistant metal. However, any like suitable material with heat resistant capacity is within the scope of the present disclosure.

In operation, when shield 20 is fitted and secured to nacelle 21 and aircraft is take-off conditions or in flight conditions, shield 20 provides adequate ventilation to mechanical engine 23 owing to openings 20*a* provided. Further, during take-off, mechanical engine 23 experiences high speed rotation because of which while flying of aircraft at lower altitude airborne animals are likely to be sucked and/or collide with fan blades 23*a* of mechanical engine 23 and end-up their lives. Also, fan blades 23*a* experiences displacement of one blade on another which results in cascading failure. Also, any foreign object when struck results in such cascading failure. Such failure can also occur when aircraft 22 is flying at a higher altitude after take-off. As, shield 20 is secured to nacelle 21 such occurrence of collision/accidents and events is prevented and saves upon life of airborne animals as well as human life travelling in aircraft and also prevents destruction of property.

Thus, safety shield 10 is simple in design because it is not conventional shield of intricate aerodynamically shape with grooves formed on intricate aerodynamic surface which are difficult to configure. Owing to simple aerodynamic design safety shield 10 is easy to manufacture and also provide adequate shielding for airborne animals for protecting their lives and foreign particles. Safety shield 10 is easy to install and remove for maintenance from nacelle 21. Safety shield 10 provides adequate ventilation to a mechanical engine provided in nacelle 21. Safety shield 10 is easy to be modified as per different shape and size of nacelle 21 and that is easily retrofitted in existing nacelles 21 or fitted in new nacelles. Safety shield 10 thus protects human life and airborne animal life and protects property destruction.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a safety shield, comprising:
   a. an aircraft having a nacelle, said nacelle housing a mechanical engine having fan blades; and
   b. a shield frame having an outer ring and an inner ring, wherein said shield frame is a flat circular structure having a thickness, said outer ring including a plurality of clamping elements in the form of bolts, said bolts being spaced apart, wherein said inner ring includes a plurality of openings dispersed thereon, wherein said plurality of openings are circular in shape, said inner ring further including a central opening having a circular shape, said shield frame being mounted to a front end of said nacelle, wherein said fan blades are located behind said inner ring, wherein said fan blades include a protruding conical section that is inserted within said central opening of said inner ring.

2. The system for a safety shield of claim 1 wherein said plurality of clamping elements are press fitted with said nacelle.

3. The system for a safety shield of claim 1 wherein said shield frame is made of a heat resistant material.

4. The system for a safety shield of claim 1 wherein said plurality of clamping elements are further layered with adhesive.

\* \* \* \* \*